US008262943B2

(12) United States Patent
Meng et al.

(10) Patent No.: US 8,262,943 B2
(45) Date of Patent: Sep. 11, 2012

(54) METHOD FOR MANUFACTURING CARBON NANOTUBE-CONDUCTING POLYMER COMPOSITE

(75) Inventors: Chui-Zhou Meng, Beijing (CN); Chang-Hong Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 274 days.

(21) Appl. No.: 12/487,284

(22) Filed: Jun. 18, 2009

(65) Prior Publication Data
US 2010/0051471 A1    Mar. 4, 2010

(51) Int. Cl.
*H01B 1/04*    (2006.01)
*H01B 1/12*    (2006.01)

(52) U.S. Cl. ........ 252/510; 252/511; 205/414; 977/742; 977/763.2

(58) Field of Classification Search .................. 252/510, 252/511; 205/414; 977/742, 763.2
See application file for complete search history.

(56) References Cited

U.S. PATENT DOCUMENTS

| | | | |
|---|---|---|---|
| 6,800,155 B2 | 10/2004 | Senecal et al. | |
| 6,936,653 B2 | 8/2005 | McElrath et al. | |
| 6,949,159 B2 | 9/2005 | Friend et al. | |
| 6,991,750 B2 | 1/2006 | Majumdar et al. | |
| 7,001,556 B1 | 2/2006 | Shambaugh | |
| 7,008,563 B2 | 3/2006 | Smalley et al. | |
| 7,022,776 B2 | 4/2006 | Bastiaens et al. | |
| 7,118,693 B2 | 10/2006 | Glatkowski et al. | |
| 7,153,903 B1 | 12/2006 | Barraza et al. | |
| 7,455,793 B2 | 11/2008 | Hsu et al. | |
| 7,462,656 B2 | 12/2008 | Keulen et al. | |
| 7,479,516 B2* | 1/2009 | Chen et al. .................... | 524/495 |
| 7,960,037 B2* | 6/2011 | Liu et al. ....................... | 428/690 |
| 2006/0118768 A1* | 6/2006 | Liu et al. ....................... | 252/500 |
| 2007/0104947 A1 | 5/2007 | Shambaugh | |
| 2008/0093224 A1 | 4/2008 | Tour et al. | |
| 2008/0145570 A1 | 6/2008 | Zhang et al. | |
| 2008/0176030 A1* | 7/2008 | Fonash et al. ................ | 428/119 |
| 2009/0053512 A1* | 2/2009 | Pyun et al. .................... | 428/336 |
| 2009/0181239 A1 | 7/2009 | Fan et al. | |
| 2010/0104808 A1 | 4/2010 | Fan et al. | |
| 2010/0127241 A1* | 5/2010 | Gruner et al. .................... | 257/20 |
| 2010/0133119 A1 | 6/2010 | Macpherson et al. | |
| 2011/0023955 A1* | 2/2011 | Fonash et al. ................ | 136/256 |

FOREIGN PATENT DOCUMENTS

| | | |
|---|---|---|
| CN | 101003909 | 7/2007 |
| CN | 101009222 | 8/2007 |
| CN | 101121791 | 2/2008 |
| TW | 233366 | 11/1994 |
| WO | WO2009016389 | 2/2009 |

OTHER PUBLICATIONS

Deng et al., "Polyaniline deposition to enhance the specific capacitance of carbon nanotubes for supercapacitors", Journal of Materials Science Letters, 40(18), 5021-5023 (2005).*
Park et al., "Dispersion of single wall carbon nanotubes by in situ polymerization under sonication", Chemical Physics Letters, 364 (2002), 303-308.*
Talbi et al., "Electropolymerization of aniline on carbonized polyacrylonitrile aerogel electrodes: applications for supercapacitors", Journal of Applied Electrochemistry, 33, 465-473 (2003).*
Xia et al., "Polymer-Encapsulated Carbon Nanotubes Prepared through Ultrasonically Initiated In Situ Emulsion Polymerization", Chem. Mater., 15, 3879-3886 (2003).*
Wang et al., "Electropolymerization and catalysis of well-dispersed polyaniline/carbon nanotube/gold composite", Journal of Electroanalytical Chemistry, 599 (2007), 121-126.*
Santos et al., "Electrografting Polyaniline on Carbon through the Electroreduction of Diazonium Salts and the Electrochemical Polymerization of Aniline", J. Phys. Chem. C, 112 (200i8), 16103-16109.*
Chen et al, Electrochemical Preparation and Characterization of Carbon Nanotube/nanocrystalline TiO2-Polyaniline Complex Film Electrode, Journal of Jilin University (Science Edition), Mar. 2007, p. 288-p. 292, vol. 45, No. 2, Changchun, China.

* cited by examiner

*Primary Examiner* — Douglas Mc Ginty
(74) *Attorney, Agent, or Firm* — Altis Law Group, Inc.

(57) ABSTRACT

A method for manufacturing a conducting polymer composite with carbon nanotubes is described. A conducting polymer is compounded with the CNT film by in-situ electrochemical polymerization.

20 Claims, 2 Drawing Sheets

METHOD FOR MANUFACTURING CARBON NANOTUBE-CONDUCTING POLYMER COMPOSITE

RELATED APPLICATIONS

This application is related to co-pending applications entitled, "CARBON NANOTUBE-CONDUCTING POLYMER COMPOSITE", U.S. patent application Ser. No. 12/317,147, filed on Dec. 19, 2008; "METHOD FOR MANUFACTURING CARBON NANOTUBE-CONDUCTING POLYMER COMPOSITE", U.S. patent application Ser. No. 12/487,291, filed on Jun. 18, 2009. The disclosures of the above-identified applications are incorporated herein by reference.

BACKGROUND

1. Technical Field

The disclosure relates to a carbon nanotube/polymer composite, and particularly to a method for making carbon nanotube-conducting polymer composite.

2. Description of Related Art

Carbon nanotubes (CNTs) have a high Young's modulus, high thermal conductivity, and high electrical conductivity, among other properties, making them an ideal composite material supplement. A composite material having CNTs as reinforcement and electrical conductor has broad applications such as microelectronics, material science, biology, and chemistry because of good anti-static performance, microwave absorbing capability, electromagnetic shielding ability, and so on.

The conventional carbon nanotube-conducting polymer composite includes a plurality of CNTs with conducting polymer pellets distributed in the gaps among the CNTs. The carbon nanotube-conducting polymer composite is applicable in the field of super capacitors and in solar cell electrodes, in which charging and discharging of the conducting polymer pellets contract and expand conducting polymer pellet's volume. The spatial structures of CNTs may alleviate the volume contraction and expansion of the carbon nanotube-conducting polymer composite caused by the mentioned volume contraction and expansion of the conducting polymer pellet. Moreover, the carbon nanotube-conducting polymer composite's high electrical conductivity may reduce the resistance of the carbon nanotube-conducting polymer composite. Therefore, the carbon nanotube-conducting polymer composite provides favorable electrical conductivity and high specific electric capacity (exceeding 200 Farad/grams). However, in conventional technology, CNTs of the carbon nanotube-conducting polymer composite require dispersal in strong oxidized acid, such as sulfuric or nitric acid and surfactant, followed by electrochemical reaction with the conducting polymer pellets, with the result that carbon nanotube-conducting polymer composite film is finally obtained on the working electrode. Additionally, since the surfactant is not easily removed from the carbon nanotube-conducting polymer composite, performance of the carbon nanotube-conducting polymer composite is negatively affected. Moreover, because CNTs are easy to reunite, in the conventional technology, the CNTs cannot form a good electric conducting network. Considerable spacing between adjacent CNTs increases resistance of the carbon nanotube-conducting polymer composite and decreases specific electric capacity thereof, adversely affecting electrical conductivity and heat conduction of the CNTs.

What is needed, therefore, is a method for manufacturing a carbon nanotube-conducting polymer composite with CNTs uniformly dispersed in the carbon nanotube-conducting polymer composite without destroying CNTs in the process.

BRIEF DESCRIPTION OF THE DRAWINGS

Many aspects of the present carbon nanotube-conducting polymer composite can be better understood with reference to the following drawings. The components in the drawings are not necessarily drawn to scale, the emphasis instead being placed upon clearly illustrating the principles of the present carbon nanotube-conducting polymer composite.

Figure 1:
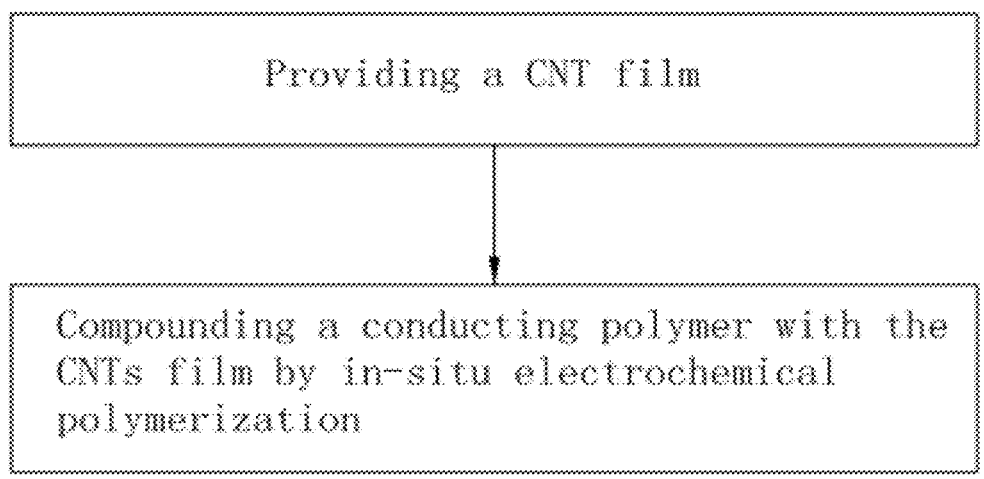
FIG. 1 is a flow chart of a method for manufacturing a carbon nanotube-conducting polymer composite in accordance with an embodiment.

Corresponding reference characters indicate corresponding parts throughout the several views. The exemplifications set out herein illustrate at least one embodiment of the present carbon nanotube-conducting polymer composite, in one form, and such exemplifications are not to be construed as limiting the scope of the invention in any manner.

DETAILED DESCRIPTION

References will now be made to the drawings to describe, in detail, the present liquid crystal display.

Referring to FIG. 1, a method for preparing a carbon nanotube-conducting polymer composite includes the following steps of: (1) providing a CNT film; (2) compounding a conducting polymer with the CNT film by in-situ electrochemical polymerization.

In step (1), the CNT film can be a grown CNT film, a flocculated CNT film, a pressed CNT film, or drawn CNT film. In the present embodiment, the CNT film is the flocculated CNT film made by a flocculating method. The method of flocculating includes the following steps of: (1a) providing a plurality of CNTs used as raw material; (1b) dispersing the CNTs into a solvent to obtain a CNT floccule structure; (1c) separating the CNT floccule structure from the solvent; and (1d) shaping the CNT floccule structure into a CNT floccule film.

In step (1a), a plurality of CNTs are prepared in the present embodiment by the following steps of:

(1a1) providing a substantially flat and smooth silicon substrate with a diameter of four inches;

(1a2) forming a catalyst layer on the substrate;

(1a3) annealing the substrate with the catalyst layer in air;

(1a4) supplying a carbon source gas to grow an array of CNTs on the substrate; and (1a5) scraping the array of CNTs from the substrate.

In step (1a1), the silicon substrate can be a P-type silicon wafer, an N-type silicon wafer or a silicon wafer formed with an oxidized layer thereon. In one embodiment, a 4-inch, P-type silicon wafer is used as the substrate.

In step (1a2), a catalyst layer is formed on the substrate, wherein the catalyst layer can be made of iron (Fe), cobalt (Co), nickel (Ni), and an alloy thereof.

In step (1a3), substrate with the catalyst layer is annealed in air at a temperature in a range from about 700° C. to about 900° C. for about 30 to 90 minutes.

In step (1a4), a carbon source gas is supplied at high temperature into a furnace for about 5 to 30 minutes thereby to grow an array of CNTs on the substrate, wherein the substrate is put in a furnace which is heated to a temperature of 400-740° C. and is filled with a protective gas. The carbon source gas can be a hydrocarbon gas, such as acetylene ($C_2H_2$). The protective gas can be made up of at least one of nitrogen ($N_2$), argon (Ar), ammonia ($NH_3$), and a noble gas. In the present embodiment, the protective gas is argon (Ar).

In step (1a5), the array of CNTs is scrapped from the substrate by a knife or other similar device to obtain the plurality of CNTs.

The CNTs grown are substantially perpendicular to the substrate. Moreover, the array of CNTs formed under the above conditions is essentially free of impurities such as carbonaceous or residual catalyst particles. The CNTs in the array are closely packed together by the van Der Waals attractive force.

The CNTs can be single-walled, double-walled, or multi-walled, or a combination thereof. Diameters of the single-walled CNTs are approximately from about 0.5 nanometers (nm) to about 50 nanometers (nm). Diameters of the double-walled CNTs are approximately from about 1.0 nm to about 50 nm. Diameters of the multi-walled CNTs are approximately from about 1.5 nm to about 50 nm. Lengths of CNTs are approximately from about 100 nm to about 10 millimeters (mm).

In step (1b), the solvent is selected from the group consisting of water and volatile organic solvent. After dispersing the CNTs into the solvent, a process of flocculating the CNTs is executed to obtain the CNT floccule structure. The process of flocculating the CNTs can be ultrasonically dispersing the CNTs or agitating the CNTs. In the present embodiment, ultrasonic dispersion is used to flocculate the solvent containing the CNTs for about 10 to about 30 minutes. Due to the CNTs in the solvent having a large specific surface area and the bundled CNTs having a strong van der Waals attractive force, the flocculated and bundled CNTs form a network structure (i.e., floccule structure).

In step (1c), the process of separating the CNT floccule structure from the solvent includes the following steps of: (1c1) pouring the solvent containing the CNTs through a filter paper in a funnel; thus (1c2) filtering out the solvent in the CNT flocculated structure.

In step (1c2), a time of filtering can be selected according to practical demands. The CNT flocculate structure on the filter is bundled together, so as to form an irregular flocculate structure.

In step (1d), the process of shaping the CNT floccule structure into a CNT floccule film includes the following steps:

(1d1) putting the CNT floccule structure into a container (not shown), and spreading the CNT floccule structure to form a predetermined structure;

(1d2) pressing the spread CNT floccule structure with a certain pressure to yield a desirable shape; and (1d3) volatilizing the residual solvent in the CNT floccule structure.

It is to be understood that the size of the spread CNT floccule structure is used to control a thickness and a surface density of the CNT film. As such, the larger the area of the CNT floccule structure, the less the thickness and density of the CNT film. The thickness of the CNT film is in the approximate range from about 1 micron to about 2 millimeters.

Further, the step (1c) and step (1d) can be accomplished by a process (1e) of pumping and filtering the CNT floccule structure to obtain the CNT film. The process (1e) includes the following steps of:

(1e1) providing a microporous membrane and an air-pumping funnel;

(1e2) filtering out the solvent from the CNT floccule structure through the microporous membrane using the air-pumping funnel; and (1e3) air-pumping and drying the CNT floccule structure attached on the microporous membrane.

In step (1e1), the microporous membrane has a smooth surface. And the aperture/diameters of micropores in the membrane are about 0.22 microns. The pumping filtration can exert air pressure on the floccule structure, thus forming a uniform CNT film. Moreover, due to the microporous membrane having a smooth surface, the CNT film can, beneficially, be easily separated from the substrate.

Bundling of the CNTs in the CNT film provides strength to the CNT film. Therefore, the CNT film is, advantageously, easy to be folded and/or bended into arbitrary shapes without rupture.

The CNT film produced by the flocculating method can have the following virtues. The CNTs are bundled together by van der Walls attractive force to form a network structure/floccule structure. Thus, the CNT film is very tough. Furthermore, the CNT film is very simply and efficiently produced by the method. A result of the production process of the method is that thickness and surface density of the CNT film are controllable.

It is to be understood that the CNT film can be a grown CNT film, a pressed CNT film, or a drawn CNT film. The grown CNT film is obtained by using chemical vapor deposition method to form a CNT film on a substrate. The CNTs of the grown CNT film are in disordered arrangement. The pressed CNT film is formed by pressing the array of CNTs using a compressing apparatus, thereby forming a pressed CNT film. The CNTs of the pressed CNT film are nearly all parallel to a surface of the pressed CNT film, and in one or many orientations according to successively oriented CNTs. A drawn CNT film is pulled out from the array of CNTs formed on a substrate. The pulling method comprises the steps of: selecting a predetermined width from the array of CNTs, and pulling the CNTs along a direction which is substantially perpendicular to the growing direction of the array of CNTs.

In step (2), compounding a conducting polymer with the CNT film by in-situ electrochemical polymerization is done, thereby obtaining a carbon nanotube-conducting polymer composite. The method of in-situ electrochemical polymerization includes the following steps of:

(2a) preparing a conducting polymer monomer acid solution;

(2b) providing a cathode electrode film;

(2c) immersing the CNT film and the cathode electrode film into the conducting polymer monomer acid solution; and (2d) compounding the conducting polymer monomers to the CNT film.

In step (2a), the conducting polymer monomer acid solution is produced by dissolving a conducting polymer monomer in an acid solution. The conducting polymer monomer acid solution is placed in a container to be used as electrolyte. The conducting polymer monomer can be aniline, pyrrole, thiophene, acetylene, paraphenylene, poly phenylene vinylene, or any combination thereof. The acid solution can be hydrochloric, sulfuric, hydrogen nitrate, phosphoric, acetic acids, or any combination thereof.

In the present embodiment, the conducting polymer monomer is aniline, the acid solution is sulfuric acid. The method of immersing the CNT film in the conducting polymer monomer acid solution comprises providing 40 milliliters (ml), 1 mol/L, sulfuric acid solution in a container, and putting 0.74504 grams of oil-like aniline monomer (0.74504 grams of oil-like aniline monomer was 0.008 mole) into the container. The oil-like aniline monomer is dissolved in the sulfuric acid solution and obtaining an aniline sulfuric acid solution with concentration is 0.2 mol/L. The aniline sulfuric acid solution is used as electrolyte.

In step (2b), a cathode electrode film is provided. The cathode electrode film can be an inert graphite electrode film, platinum electrodes film, stainless steel electrode film, or a CNT layer. The surface area of the cathode electrode film is greater than or equal to the surface area of the CNT film provided in step (1). The cathode electrode film has good electrical conductivity. The CNTs layer can be a flocculated CNT film, a grown CNT film, a pressed CNT film, or a drawn CNT film. The CNTs layer can be made by CNT wires, or combined the CNTs wires and CNT film. The CNTs layer can be composed by CNTs and other composite material. The composite material can be polymer, metal, nonmetal, or any combination thereof. The polymer can be made of thermosetting resin or thermoplastic resin. The thermosetting resin can be phenolic, epoxy, bismaleimide, polybenzoxazine, cyanate ester, polyimide, unsaturated polyamide ester, or any combination thereof. The thermoplastic resin can be polyethylene, polyvinyl chloride, polytetrafluoroethylene, polypropylene, polystyrene, polymethyl methacrylate acrylic, polyethylene terephthalate, polycarbonate, polyamide, poly (butylene terephthalate), polyether ketone, polyether sulfone, ether sulfone, thermoplastic polyimide, polyetherimide, polyphenylene sulfide, polyvinyl acetate, paraphenylene benzobisoxazole, or any combination thereof. The metal can be copper, gold, silver, and the alloys thereof, having good electrical conductivity. The nonmetal can be ceramics or clay soil. In the present embodiment, the cathode electrode film is the CNT film.

In step (2c), immersing the CNT film and the cathode electrode film into the conducting polymer monomer acid solution. The CNT film and the cathode electrode film are spacedly parallel to each other.

The weight ratio of the CNT film and conducting polymer monomer in the conducting polymer monomer acid solution ranges of about 2:9 to about 4:5. The distance between the CNT film and the cathode electrode film ranges of about 0.5 centimeters to about 3 centimeters.

In the present embodiment, two CNT films having equivalent surface areas are immersed in the aniline sulfuric acid solution. One of the CNT films is used as the cathode electrode film and electrically connected to a negative pole. The other CNT film is used as an anode electrode film and electrically connected to a positive pole. The distance between the anode and cathode electrodes is about 1 centimeter. An oxidative polymerization reaction happens on the anode electrode film, and the conducting polymer monomer is polymerized to conducting polymer fibers. The conducting polymer fibers are adhered to the CNTs surfaces of the anode electrode film. The conducting polymer fibers connect with each other to form a conducting polymer fiber network. The conducting polymer fiber network adheres to the CNTs surfaces of the anode electrode film.

Lengths of the conducting polymer fibers are approximately from about 100 nanometers (nm) to about 10 millimeter (mm). Diameters of the conducting polymer fibers are approximately from about 30 nanometers (nm) to about 120 nanometers (nm). An electric potential between the anode electrode and cathode electrode is produced by applying a constant current, constant voltage, or scanning voltage to the anode electrode and cathode electrode. When scanning voltage is applied to the anode electrode and cathode electrode, the voltage of the scanning voltage is about −0.2 voltages (V) to about 1.2 voltages (V), the velocity of the scanning voltage is in a range from about 1 mV/sec to about 1000 mV/sec, the scanning time stands for about 0.5 hours to about 4 hours, and the scanning frequency is about 10 to about 10000 times. When constant current is applied to the anode electrode and cathode electrode, the current is about 10 mA to about 10 A, the applying time stand for 0.5 hours to about 4 hours. When constant voltage is applied to the anode electrode and cathode electrode, the voltage of the constant voltage is about 0.5 V to about 1.2 V, and the applying time stands for about 0.5 hours to about 4 hours.

In the present embodiment, the cathode electrode film is electrically connected to a negative pole and anode electrode film is electrically connected to a positive pole. Wherein 0.75 voltages is applied to between the positive pole and the negative pole for about 2 to about 3 hours. The oxidation reaction occurs at the anode electrode film, with the result that polyaniline fiber is obtained on the anode electrode. The polyaniline fiber is adhered to the CNT surfaces of the anode electrode film. Lengths of the polyaniline fiber are about 200 nm to about 1 mm, and diameters of the polyaniline fiber are about 50 nm to about 80 nm. There are no polyaniline fibers obtained on the cathode electrode. It is to be understood, the anode electrode film and the cathode electrode film can be replaced by each other.

In the above-described steps, an additional step (3) of cleaning and baking the carbon nanotube-conducting polymer composite can be further provided after the step of polymerizing the polyaniline fiber on the anode electrode film. The step (3) includes the substeps of:

(3a) taking out the carbon nanotube-conducting polymer composite from the electrolyte;

(3b) putting the carbon nanotube-conducting polymer composite into a deionized water to remove the ion on the carbon nanotube-conducting polymer composite;

(3c) putting the carbon nanotube-conducting polymer composite into a container with an ethanol to remove the residual organic impurities; and (3d) placing the carbon nanotube-conducting polymer composite in a furnace at a temperature of about 80° C. for 4 hours.

The ethanol on the carbon nanotube-conducting polymer composite is vaporized. In step (3), the ion and organic impurities will be removed from the carbon nanotube-conducting polymer composite.

Figure 2:
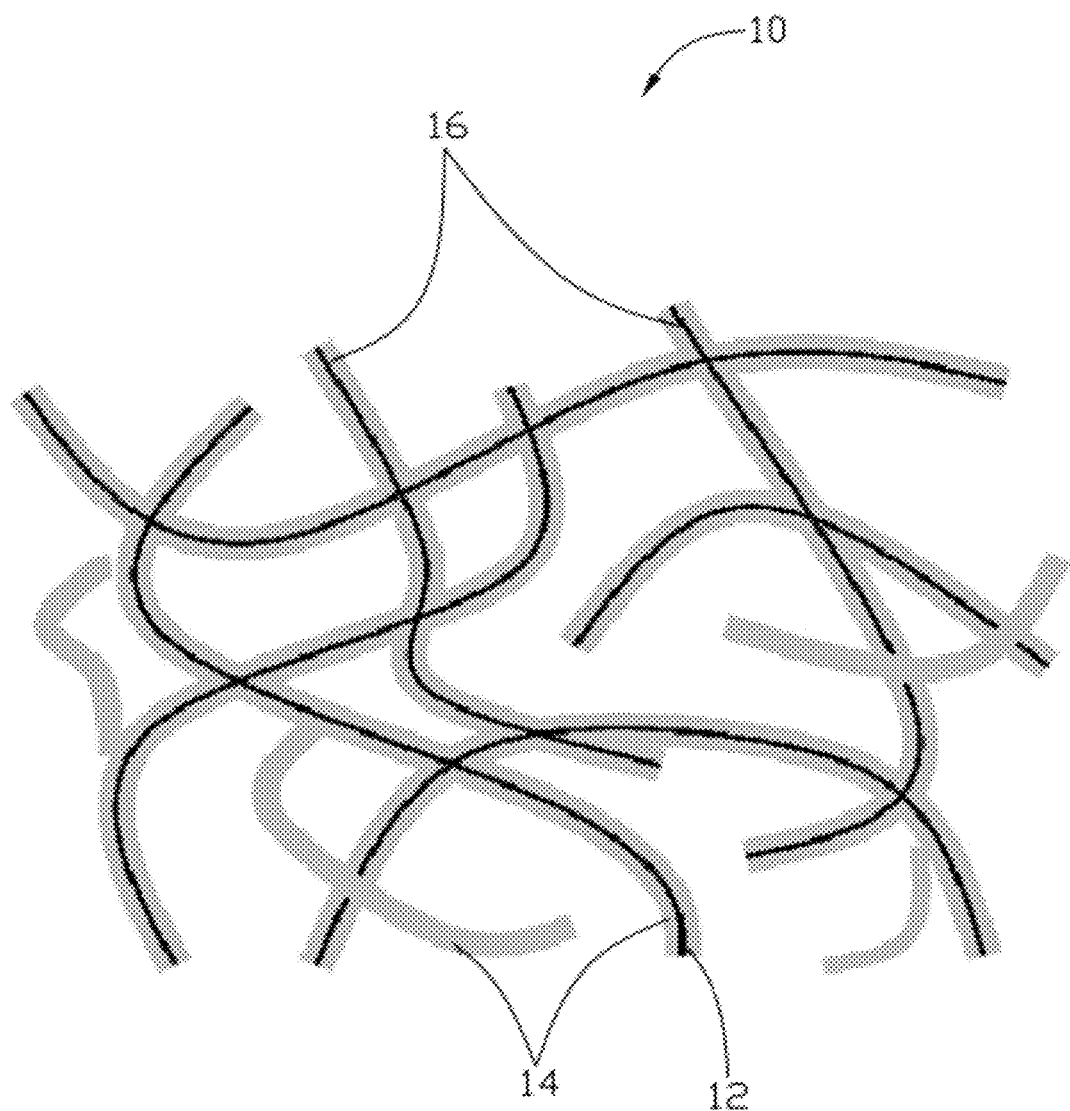
FIG. 2 is a schematic view of the carbon nanotube-conducting polymer composite of FIG. 1, wherein the carbon nanotube-conducting polymer includes disordered CNTs.

Referring to FIG. 2, a carbon nanotube-conducting polymer composite 10 includes a number of CNTs 12 and conducting polymer fibers 14. The CNTs 12 are connected to each other to form a CNT network 16. The conducting polymer fibers 14 adhere to surfaces of the CNTs 12. The CNT network 16 forms a skeleton to which the conducting polymer fibers 14 adhere. The CNTs 12 and the conducting polymer fibers 14 are uniformly distributed in the carbon nanotube-conducting polymer composite 10.

Compared to conventional methods for manufacturing a carbon nanotube-conducting polymer composite, the method, in accordance with a present embodiment, of manufacturing a carbon nanotube-conducting polymer composite has at least the following advantages. Firstly, because the CNTs in the carbon nanotube film are connected with each other to form a carbon nanotube network, the conducting polymer fibers adhere to surfaces of the CNTs, the CNTs and conducting polymer fibers are uniformly distributed in the carbon nanotube-conducting polymer composite. Further, the surfactant is not easily removed from the carbon nanotube-conducting polymer composite. Additionally, because of the anode and cathode electrodes are both CNT films, the two CNT films can alternate between being the anode and the cathode. Such that when one CNT film is finished collecting fibers, the current can be switched to obtain the carbon nanotube-conducting polymer composite on the other CNT film. This can reduce the amount of time required to produce the composite. As well, the method includes uncomplicated equipment, low cost and being suitable for mass production.

Finally, it is to be understood that the embodiments described are intended to illustrate rather than limit the invention. Variations may be made to the embodiments without departing from the spirit of the invention as claimed. The embodiments illustrate the scope of the invention but do not restrict the scope of the invention.

What is claimed is:

1. A method for manufacturing a carbon nanotube-conducting polymer composite, the method comprising steps of:
    providing a carbon nanotube (CNT) film;
    preparing a conducting polymer monomer acid solution;
    immersing the CNT film into the conducting polymer monomer acid solution; and
    compounding the conducting polymer with the CNT film by in-situ electrochemical polymerization.

2. The method of claim 1, wherein the CNT film is a grown CNT film, a flocculated CNT film, a pressed CNT film, or a drawn CNT film.

3. The method of claim 1, wherein the CNT film is a flocculated CNT film, the flocculated CNT film is made by steps of:
    providing a plurality of CNTs;
    adding the CNTs to a solvent to form a CNT floccule structure;
    separating the CNT floccule structure from the solvent;
    shaping the CNT floccule structure into a flocculated CNT film; and
    removing a residual solvent from the flocculated CNT film.

4. The method of claim 1, wherein the method of in-situ electrochemical polymerization comprises substeps of:
    preparing a conducting polymer monomer acid solution;
    providing a cathode electrode film;
    immersing the CNT film and the cathode electrode film into the conducting polymer monomer acid solution; and
    producing an electric potential between the CNT film and the cathode electrode film.

5. The method of claim 4, wherein the conducting polymer monomer is oxidized on the CNT film, and the conducting polymer monomer is evenly polymerized to a plurality of conducting polymer fibers.

6. The method of claim 5, wherein the conducting polymer fibers connect with each other to form a conducting polymer fibers network.

7. The method of claim 4, wherein the electric potential is produced by applying a constant current between the CNT film and the cathode electrode film, the constant current ranges from about 10 mA to about 10A, and an applying time ranges from about 0.5 hours to about 4 hours.

8. The method of claim 4, wherein the electric potential is produced by applying a constant voltage to the CNT film and the cathode electrode film, the constant voltage ranges from about 0.5 V to about 1.2 V, and an applying time ranges from about 0.5 hours to about 4 hours.

9. The method of claim 4, wherein the electric potential is produced by applying a scanning voltage to the CNT film and the cathode electrode film, the scanning voltage has a voltage in a range from about −0.2 V to about 1.2V, and an applying time is about 0.5 hours to about 4 hours.

10. The method of claim 4, wherein the cathode electrode film is another CNT film.

11. The method of claim 10, wherein the electric potential is switched between the CNT film and the cathode electrode film.

12. The method of claim 4, wherein the cathode electrode film comprises a material selected from the group consisting of a graphite electrode film, platinum electrodes film, stainless steel electrode film, and CNTs layer.

13. The method of claim 4, wherein the CNT film and the cathode electrode film are spaced from and parallel to each other.

14. The method of claim 4, wherein the conducting polymer monomer comprises aniline.

15. The method of claim 4, wherein a weight ratio of the CNT film and conducting polymer monomer in the conducting polymer monomer acid solution ranges from about 2:9 to about 4:5.

16. The method of claim 4, wherein the conducting polymer monomer acid solution made by following steps of:
    providing a conducting polymer monomer;
    preparing an acid solution;
    dissolving the conducting polymer monomer in the conducting polymer monomer acid solution to obtain the conducting polymer monomer acid solution.

17. A method for manufacturing a carbon nanotube-conducting polymer composite, the method comprising steps of:
    providing a carbon nanotube (CNT) film;
    preparing a conducting polymer monomer acid solution;
    providing a cathode electrode film;
    immersing the CNT film and the cathode electrode film into the conducting polymer monomer acid solution, wherein the CNT film and the cathode electrode film are spaced from each other; and
    applying a voltage between the CNT film and the cathode electrode film to compound the conducting polymer with the CNT film by in-situ electrochemical polymerization.

18. The method of claim 4, wherein the conducting polymer composite is polyaniline fiber; a length of the polyaniline fiber ranges from about 100 nanometers to about 10 millimeter; and a diameter of the polyaniline fiber ranges from about 30 nanometers to about 120 nanometers.

19. The method of claim 4, the method further comprising a cleaning steps of:
    putting the carbon nanotube-conducting polymer composite into deionized water;
    putting the carbon nanotube-conducting polymer composite into a fluid comprising ethanol to remove residual organic impurities;
    placing the carbon nanotube-conducting polymer composite in a furnace at a temperature in 80° C. for about 2 hours to about 6 hours.

20. The method of claim 4, wherein the conducting polymer monomer comprises a material selected from the group consisting of pyrrole, thiophene, acetylene, paraphenylene, poly phenylene vinylene, and any alloy thereof.

* * * * *

UNITED STATES PATENT AND TRADEMARK OFFICE
CERTIFICATE OF CORRECTION

PATENT NO.      : 8,262,943 B2
APPLICATION NO. : 12/487284
DATED           : September 11, 2012
INVENTOR(S)     : Chui-Zhou Meng et al.

Page 1 of 1

It is certified that error appears in the above-identified patent and that said Letters Patent is hereby corrected as shown below:

On the title page, please insert Item (30) regarding "Foreign Application Priority Data" with the following:

-- (30)     Foreign Application Priority Data

Aug. 29, 2008   (CN) ..........................200810141763.2 --

Signed and Sealed this
Twenty-ninth Day of October, 2013

Teresa Stanek Rea
*Deputy Director of the United States Patent and Trademark Office*